INVENTORS
John C. Rill, Jr.
Robert C. Reid
BY
Carl A Stickel
THEIR ATTORNEY

INVENTORS
John C. Rill, Jr.
Robert C. Reid
BY Carl A Stickel
THEIR ATTORNEY

INVENTORS
John C. Rill, Jr.
Robert C. Reid
BY
Carl A. Stickel
THEIR ATTORNEY

April 27, 1965 J. C. RILL, JR., ETAL 3,180,350
MIXING APPARATUS
Filed April 20, 1962 4 Sheets-Sheet 4

INVENTORS
John C. Rill, Jr.
Robert C. Reid
BY
Carl A. Stickel
THEIR ATTORNEY

3,180,350
MIXING APPARATUS
John C. Rill, Jr., Dayton, and Robert C. Reid, Springfield, Ohio, assignors to General Motors Corporation, Detroit, Mich., a corporation of Delaware
Filed Apr. 20, 1962, Ser. No. 189,165
2 Claims. (Cl. 137—240)

This invention pertains to an improved method of and apparatus for the mixing of viscous liquids. In the mixing of viscous liquids, it is necessary that the liquids be maintained in a substantially constant, readily flowable state. The viscosity is lowered by maintaining the liquids at a constant elevated temperature. Arrangements must be made for preventing the liquids from becoming viscose within the apparatus. To facilitate this, it is desirable to provide an arrangement wherein the flow of each component can be controlled individually as well as simultaneously.

It is an object of this invention to provide a simple, easily cleaned, mixing apparatus having means for controlling each component individually as well as simultaneously.

It is another object of this invention to provide a simple, easily cleaned, mixing apparatus having means for flushing the mixing chamber when one of the components is shut off.

It is another object of this invention to provide a simple, easily cleaned, mixing apparatus having a flushing system controlled by one of the valves which controls one of the components to be mixed.

It is another object of this invention to provide an improved method of and apparatus for controlling individually and mixing viscous fluids in predetermined ratios with a minimum of air.

These and other objects are attained in the form shown in the drawings in which the separate supply tanks and pumps for each component are separately enclosed in insulated walls providing separate enclosures for each component through which heated air is circulated and controlled to maintain each of the components individually at constant, desirable temperatures. Separate parallel plug-type valves in the mixer housing control the recirculation of each component and also the delivery to the mixing chamber. The recirculating system as well as the mixer housing is also provided with a controlled heating system. Provision is made for evacuating the tanks and also the application of dry nitrogen to the viscous liquid in the tanks. One or both of the plugs is arranged with a passage registering with flushing passages in the mixer housing for supplying a flushing solvent to the mixing chamber when this valve is in the recirculating position. The plug valves are connected through positive pin clutches to intermeshing gears, one of which has interrupted teeth and is provided with an operating handle provided with an arcuate slot receiving a fixed pin for limiting its movement. The mixing chamber is provided with a restricted outlet so as to prevent the entrance of air into the mixture.

Further objects and advantages of the present invention will be apparent from the following description, reference being had to the accompanying drawings wherein a preferred embodiment of the present invention is clearly shown.

Figure 2:
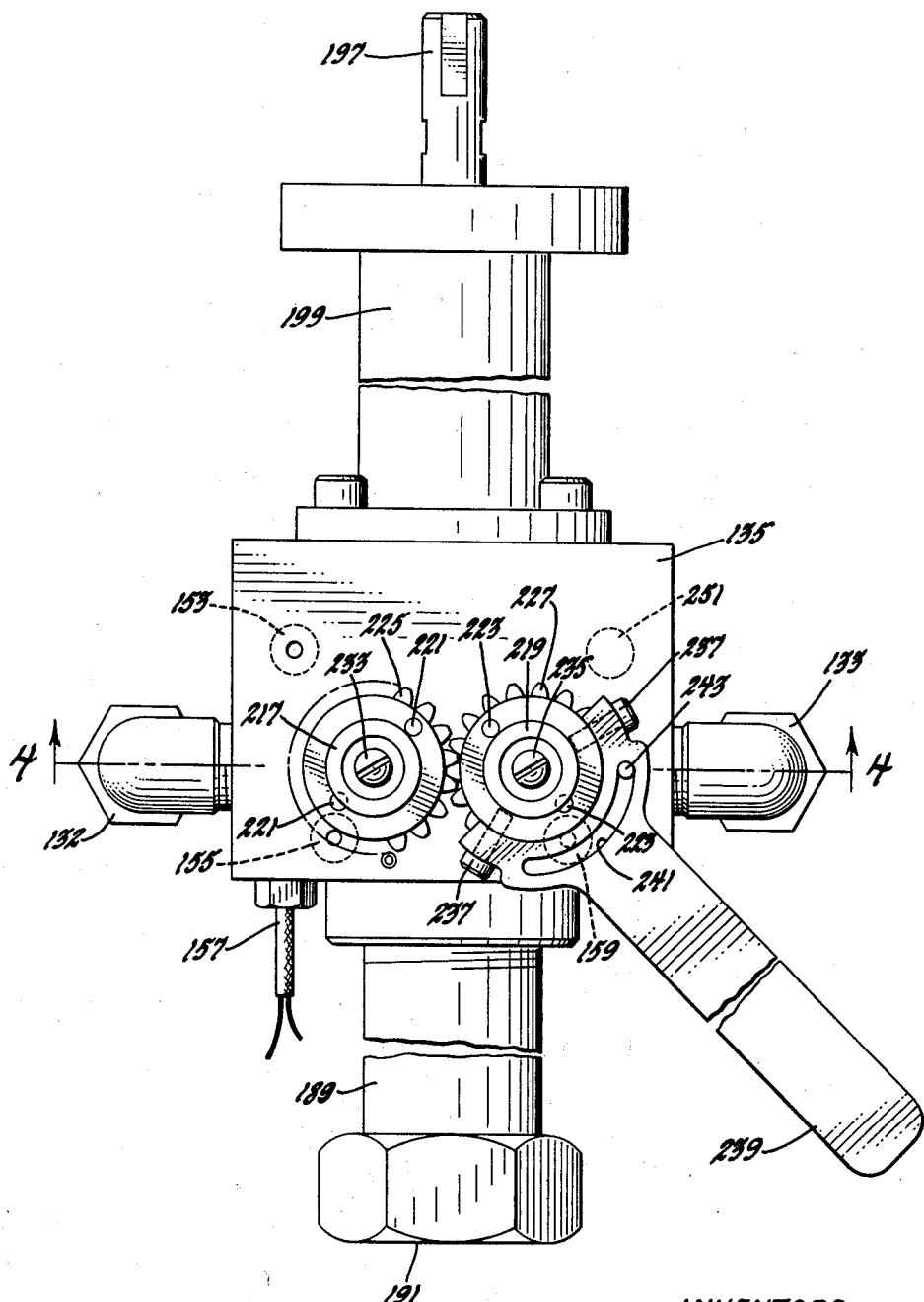
FIGURE 2 is a view in elevation of a portion of the mixing apparatus actually accomplishing the mixing and including the valves and mixing chamber.
Figure 3:
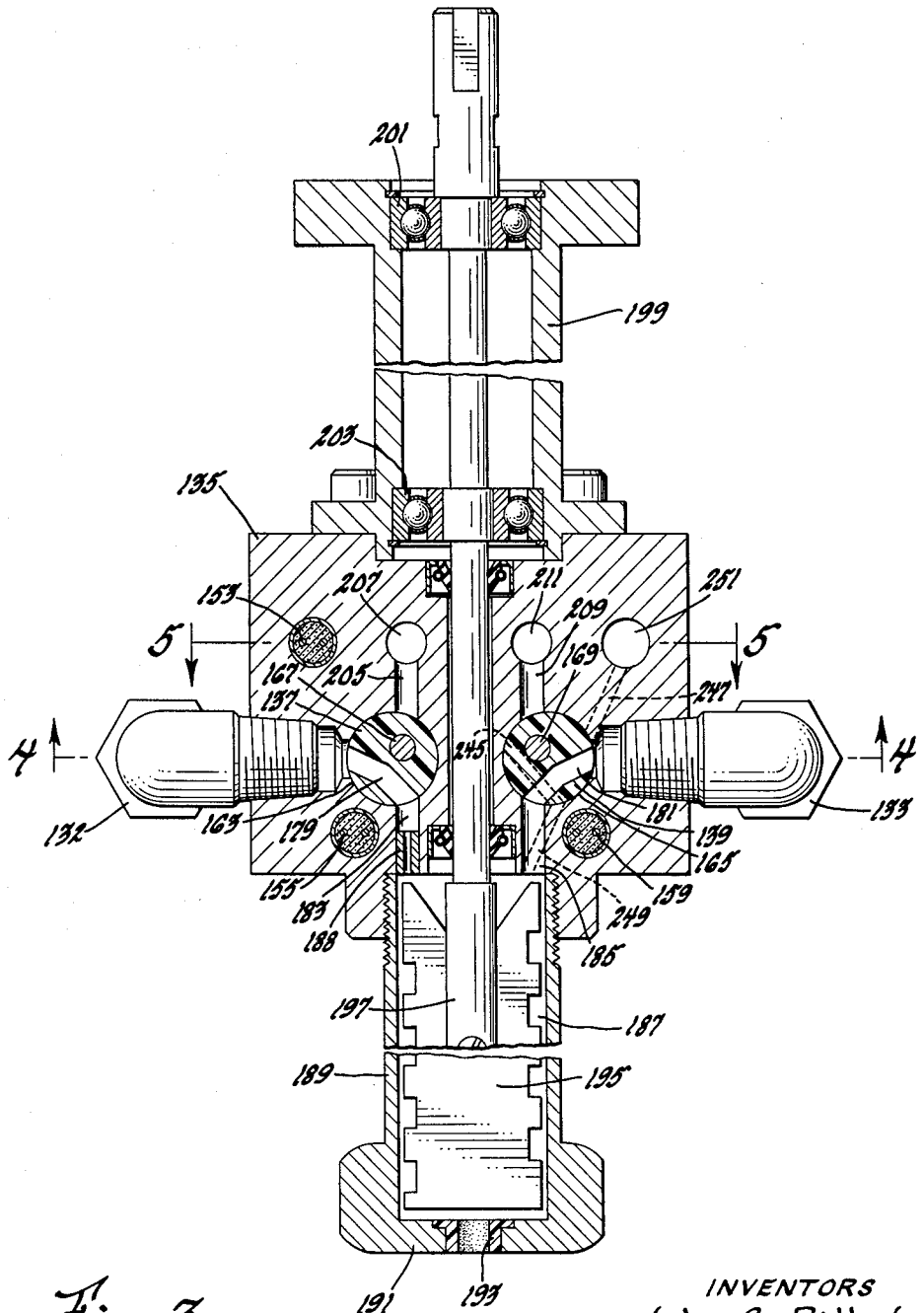
FIGURE 3 is a vertical sectional view of the apparatus shown in FIGURE 2 taken along the line 3—3 of FIGURE 5.
Figure 4:
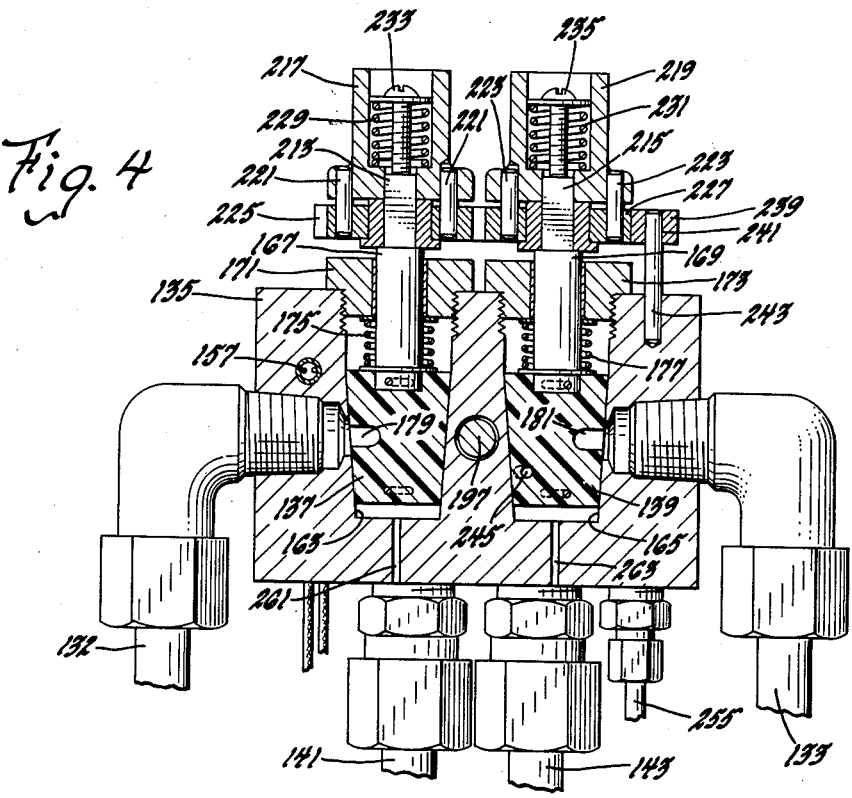
Figure 5:
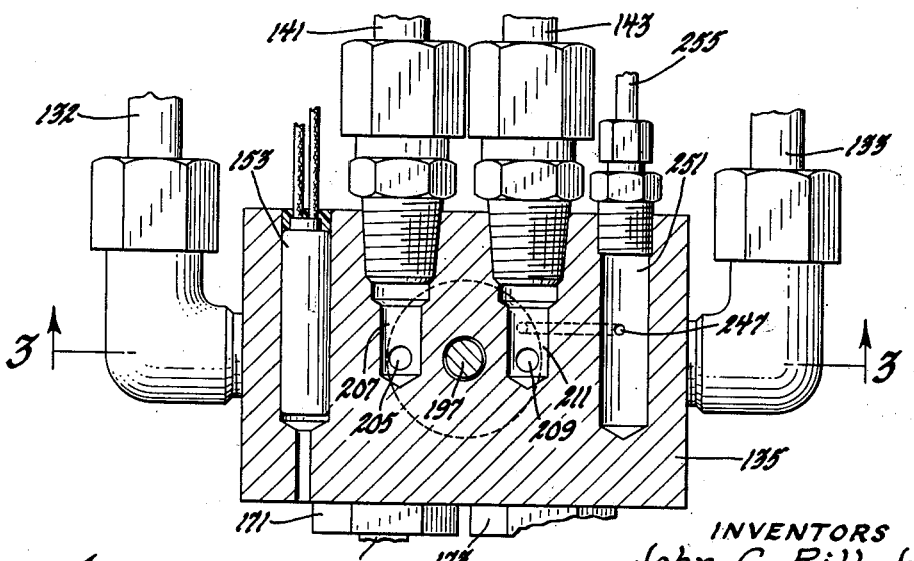

FIGURE 4 is a horizontal sectional view taken on the line 4—4 of FIGURES 2 and 3; and FIGURE 5 is a horizontal sectional view taken along the line 5—5 of FIGURE 3.

Figure 1:
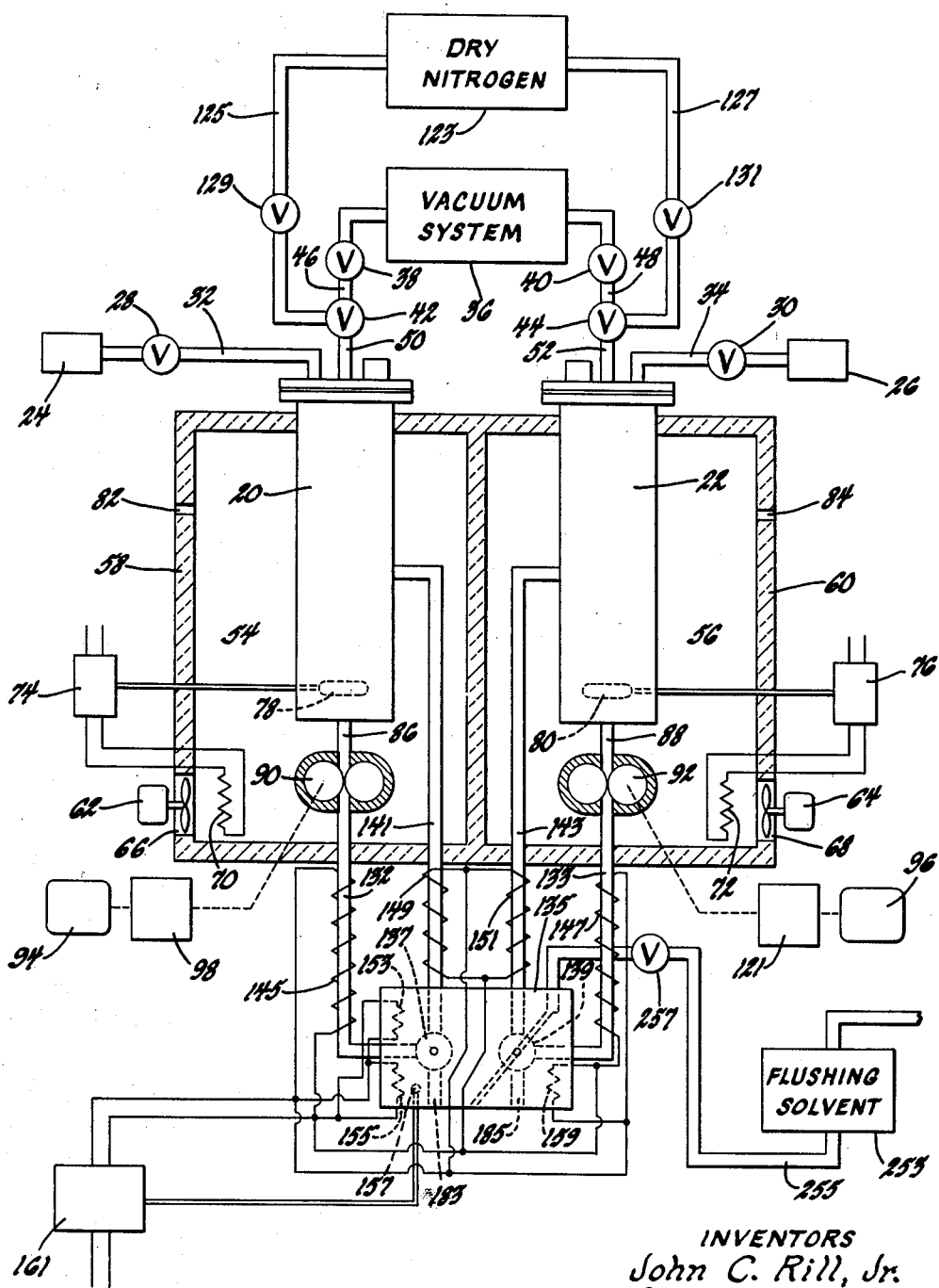
FIGURE 1 is a diagrammatic view of a mixing apparatus for carrying out our improved method.

In the mixing apparatus as shown diagrammatically in FIGURE 1, the part for each of the components, such as the catalyst system and the resin system are identical and located side by side. For example, each of the tanks 20 and 22 are supplied from the sources of supply 24 and 26 under the control of the valves 28 and 30 through the conduits 32 and 34. To prevent bubbles of gas and air in the mixture as delivered, a vacuum system 36 is provided which is connected to each of the tanks 20 and 22 through the valves 38 and 40, the three-way valves 42 and 44 and the conduits 46, 48, 50 and 52. By this arrangement, after the tanks 20 and 22 are charged from the sources of supply 24 and 26, the tanks 20 and 22 are evacuated by operating the valves 38, 40, 42 and 44 so as to connect the tanks 20 and 22 with the vacuum system 36. After this is accomplished, these valves are closed.

The tanks 20 and 22 are located in the chambers 54 and 56 which are enclosed by the insulated walls 58 and 60. Air is circulated into each of the chambers 54 and 56 by continuously operating separate electric fans 62 and 64 which bring in external air continuously through the openings 66 and 68. Separate electric heaters 70 and 72 are located within the chambers 54 and 56 in the blast of the fans 62 and 64 and are connected to and controlled by the thermostat switches 74 and 76, having their thermostat bulbs 78 and 80 located in the tanks 20 and 22. Thereby the air within the chambers 54 and 56 has its temperature controlled so as to maintain substantially constant the temperatures of the components within the tanks 20 and 22. The chambers 54 and 56 have suitable outlets 82 and 84 so as to allow continuous circulation of the heated air through the chambers 54 and 56, so as to maintain accurately the temperature of the components within the tanks 20 and 22. These temperatures will, of course, vary with the components used. As one specific example, we propose to supply to the tank 20 a catalyst which is solid at 230° F. but is liquid at 250° F.; therefore, if such catalyst is used, the thermostat switch 74 is set to maintain the temperature of the catalyst within the tank 20 at 250° F. The tank 22, as one specific example, may contain toluene diisocyanate and ether. Its temperature must be maintained at about 180° F. to achieve the proper fluidity and, therefore, the thermostat 76 is set to maintain the material or resin within the tank 22 at this temperature of 180° F.

The outlets at the bottom of each of the tanks 20 and 22 are connected by the conduits 86 and 88 to the inlets of the gear-type pumps 90 and 92 beneath. These pumps 90 and 92 as well as the conduits 86 and 88 are also located in the chambers 54 and 56 so that they are maintained at substantially the same temperatures as the material within the tanks 20 and 22 so that proper fluidity is maintained for these materials as they are delivered from these tanks. These pumps 90 and 92 are each driven by separate substantially constant speed, synchronous motors 94 and 96 through separate continuously variable accurately selectable ratio, transmissions 98 and 121.

These transmissions 98 and 121 connect respectively to the pumps 90 and 92 and, by selecting the proper ratio for each of these transmissions, the pumps 90 and 92 will be operated at such a speed as to deliver the correct proportions of materials at the correct rates from the tanks 20 and 22 so as to supply the desired mixture to the mixing chamber. The proportion may be one part of the component from the tank 20 and four parts from the tank 22, for example.

To assist in the delivery of the components from the tanks 20 and 22 to the pumps 90 and 92, there may be provided a source of dry nitrogen 123, containing nitrogen under suitable pressure, such as one pound per square inch, which deliver the nitrogen through the conduits 125 and 127 under the control of the valves 129 and 131 to the three-way valves 42 and 44 which are turned to provide a connection with the top of the interior of the tanks 20 and 22 respectively. This prevents the creation of a vacuum within the tanks 20 and 22 and assures an uninterrupted flow to the pumps 90 and 92, assuring maintenance of the proper ratio of components in the mixing chamber without introducing gas into the mixture.

The output of the pumps 90 and 92 is delivered through the conduits 132 and 133 to the opposite sides of the valve block 135. The valve block 135 contains two parallel plug valves 137 and 139 which may be turned either to deliver the two components to the mixing chamber or may be turned to a shut-off position in which the components are recirculated back to the tanks 20 and 22 through the return conduits 141 and 143. The electric heaters 145 and 147 are associated with the conduits 132 and 133 while electric heaters 149 and 151 are associated with the return conduits 141 and 143. The electric heaters 153, 155, and 159 are provided in the valve block 135. The heaters 145, 147, 149, 151, 153, 155 and 159 are all connected in parallel with each other and controlled by a single switch mechanism 161 under the control of a thermocouple 157 located in the valve block 135.

The tapered plug valves, as shown in FIGURES 2 to 5, are lodged side by side in parallel relation within the tapered bores 163 and 165. These tapered plugs 137 and 139 are preferably of tetrafluoroethylene and are pinned to shafts 167 and 169 which are rotatably mounted in the bushings 171 and 173 which are threaded into the outer end of the tapered bores 163 and 165. The coil springs 175 and 177 surround the shafts 167 and 169 and press against the threaded bushings 171, 173 at one end and against the tapered plug valves 137 and 139 at their other ends in order to keep the plug valves 137 and 139 in tight contact with the bores 163 and 165 so as to prevent any leakage of any of the components from the bores 163 and 165. The tetrafluoroethylene material has such a low coefficient of friction in the bores 163 and 165 that it is possible to maintain this tightness without binding.

The valve plugs 137 and 139 are provided with transverse passages 179 and 181 which may be turned to register with passages connecting with the conduits 132 and 133 and the passages 183 and 185 which extend to the mixing chamber 187. The passage 183 is provided with an orifice plug 188 to reduce its outlet in proportion to the relatively reduced flow required to keep the catalyst in proper proportion to the resin component. The mixing chamber 187 is provided by a cylindrical member 189 which is threaded into the block 135 at the top and at the bottom is provided with a wall 191 containing a flanged plug 193 of tetrafluoropolyethylene which restricts the flow out of the mixing chamber 187 sufficiently that the mixed material will flow out of the mixing chamber 187 in a solid stream so as to prevent any air from being entrained in the mixing chamber 187 or in the delivery of the mixture to the place of deposit. The mixing chamber 187 contains a flat-toothed blade 195 connected to the lower end of a mixer shaft 197 extending upwardly through a drilled passage in the valve block 135 to the double bearing support 199 fastened to the top of the valve block. The shaft 197 is supported by the ball bearings 201 and 203 which are mounted at the top and bottom of the support 199. The upper end of the shaft 197 is connected to a suitable electric motor capable of rotating it at high speed.

The valve block 135 is also provided with the recirculating passages 205, 207 connecting the valve bore 163 with the recirculating conduit 141 and the recirculating passages 209 and 211 connecting the valve bore 165 with the recirculating conduit 143. Each of the valve shafts 167 and 169 are provided with square-end portions 213 and 215 of reduced size. Slidably mounted on these square-end portions 213 and 215 are the pin clutches 217 and 219. The pin clutches 217 and 219 each have a pair of projecting pins 221 and 223 extending respectively through the full gear 225 and the interrupted gear 227 which mesh with each other. These gears are each rotatably mounted on bushings which are mounted on the square shaft portions 213 and 215. The pin clutches 217 and 219 are normally held in the engaged positions by the coil springs 229 and 231 which are held by washers upon the screws 233 and 235 which thread into the ends of the shafts 167 and 169. The interrupted gear 227 has an interrupted portion extending through 180°. Fastened to this interrupted portion by the screws 237 is a handle 239 which is limited in its movement by having an arcuate slot 241 fitting or receiving the pin 243 extending outwardly from the valve block 135.

In the clockwise position of the handle 239, both valves 137 and 139 are moved to and held in the delivery position in which their passages 179 and 181 register with the supply conduit connections 132 and 133 as well as the delivery passages 183 and 185. When the handle 239 is turned counterclockwise through 90°, the plug valves 137 and 139 are turned so that their passages 179 and 181 connect the supply conduits 132 and 133 with the recirculating passages 205 and 207 and 209 and 211 respectively for recirculation of the two components.

When delivery of the components to the mixing chamber 187 is interrupted for more than a brief interval, it may be desired to immediately flush the mixing chamber 187 with a suitable solvent. To make certain that none of this flushing solvent gets into the mixture which is to be delivered for the manufacture of the items of production, there is provided in the plug valve 139 an additional passage 245. This passage 245 is located nearer the smaller end of the plug valve 139 than the passage 181 and is transverse thereto so that, when the passage 181 is moved to recirculating position, the passage 245 is moved to a position registering with the flushing passages 247 and 249 which extend from the passage 251 to the mixing chamber 187. The flushing solvent is delivered from a suitable supply tank 253 through a conduit 255 under the control of a valve 257 to the passage 251 for delivery to the mixing chamber 187.

Under certain conditions, it is often desired to deliver only one of the components to the mixing chamber. To accomplish this, the handle 239 is initially turned 90° clockwise to the recirculating position. The clutch of the material that it is desired to keep in recirculation is then declutched by pulling outwardly either of the clutches 217 or 219, as selected, until the pins 221 or 223 are disengaged from their respective gears 225 or 227. The handle 239 can then be moved in a clockwise direction as far as desired until the pin 243 is engaged by the end of the slot 241 to deliver the one component desired. When a sufficient quantity of the one component has been delivered, the handle 239 may be again returned to the recirculating position and the other clutch may be reengaged for normal operation.

If it is desired to stop the delivery of only one component during a delivery operation, the clutch of the other component may be disengaged after which the handle 239 can be moved counterclockwise 90° to the recirculating position, thereby causing the recirculation of the component whose clutch remains engaged. This arrangement increases the versatility and usefulness of the apparatus and makes it possible to separately ascertain if each of the components individually are in a suitable condition to begin operation.

The closed ends of the tapered recesses 163 and 165 are provided with escape passages 261 and 263 which permit the escape of any liquids or gases which may be trapped therein. These passages 261 and 263 may also be used to apply flushing solvent or lubricant to the plug valves 137 and 139 if desired.

While the embodiment of the present invention as herein disclosed constitutes a preferred form, it is to be understood that other forms might be adopted.

What is claimed is as follows:

1. Mixing apparatus including a mixer housing enclosing a mixing chamber, first and second conduit means connected to said housing for supplying components to said mixing chamber, first valve means associated with said housing for controlling the flow of the first component from said first conduit means to said mixing chamber, second valve means associated with said housing for controlling the flow of the second component from said second conduit means to said mixing chamber, first and second gears meshing with each other, first clutch means operatively connecting said first gear and said first valve means, means operatively connecting said second gear and said second valve means, and operating means to operate said gears for operating said valve means to open and closed position, a third conduit means connected to said housing for supplying a flushing liquid thereto, said housing being provided with a flushing passage extending from said third conduit means to one of said valve means and a second flushing passage extending from said one valve means to said mixing chamber for flushing said mixing chamber, one of said valve means being provided with means effective in the open position for preventing flow through said flushing passages to said mixing chamber and having means effective in the closed position for connecting said flushing passages for permitting flow through said flushing passages to said mixing chamber.

2. Mixing apparatus including a mixer housing enclosing a mixing chamber, said housing being provided with first and second plug valves having their axes parallel and adjacent to each other, first and second supply conduit means connected to said housing, said housing having a first passage extending from said first supply conduit means to said first plug valve and a second passage extending from said second supply conduit means to said second plug valve, separate passages extending from said first and second plug valves to said mixing chamber, said plug valves being provided with shaft extensions, meshing gears rotatably mounted on said shaft extensions, positive clutch means for positively connecting and disconnecting said gears and said valves, and means for rotating said gears to rotate said valves, said plug valves having closed and open positions, third conduit means connected to said housing for supplying a flushing liquid thereto, third passage means extending from said third conduit means to one of said plug valves, said one plug valve being provided with a passage registering when in its closed position with said third passage means for supplying the flushing liquid to said mixing chamber.

References Cited by the Examiner
UNITED STATES PATENTS

| | | | |
|---|---|---|---|
| 979,532 | 12/10 | Merrill | 137—609 |
| 1,037,135 | 8/12 | Tomlinson et al. | 137—240 |
| 1,379,025 | 5/21 | Jones | 137—635 |
| 2,177,243 | 10/39 | Chandler | 137—341 |
| 2,318,638 | 5/43 | Scott | 137—240 |
| 2,770,248 | 11/56 | Audia | 137—240 |
| 2,771,903 | 11/56 | Notarbartolo et al. | 137—341 |
| 2,790,461 | 4/57 | Lightfoot | 137—609 |

ISADOR WEIL, *Primary Examiner.*

WILLIAM F. O'DEA, *Examiner.*